Figure 1:
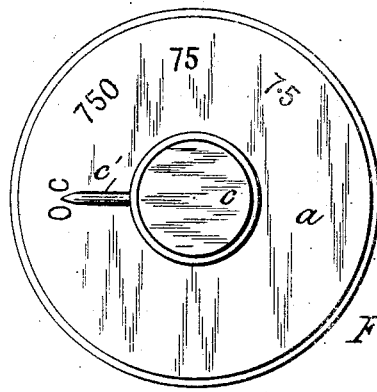

No. 846,084. PATENTED MAR. 5, 1907.
A. O. BENECKE.
ELECTRICAL MEASURING INSTRUMENT.
APPLICATION FILED DEC. 13, 1906.

WITNESSES:
G. A. Alliston.
Edward S. Black.

INVENTOR
Adelbert O. Benecke
BY
Fischer & Sanders.
ATTORNEYS.

UNITED STATES PATENT OFFICE.

ADELBERT O. BENECKE, OF NEWARK, NEW JERSEY, ASSIGNOR TO AMERICAN INSTRUMENT COMPANY, OF NEWARK, NEW JERSEY, A CORPORATION OF NEW JERSEY.

ELECTRICAL MEASURING INSTRUMENT.

No. 846,084.  Specification of Letters Patent.  Patented March 5, 1907.

Application filed December 13, 1906. Serial No. 347,594.

*To all whom it may concern:*

Be it known that I, ADELBERT O. BENECKE, residing at Vailsburgh, in the city of Newark, county of Essex, and State of New Jersey, have invented a new and useful Improvement in Electrical Measuring Instruments; and I do hereby declare the following to be a clear, concise, and exact description of the invention, such as will enable others skilled in the art to which it pertains to make and use the same.

My invention relates to improvements in electrical measuring instruments—such as voltmeters, wattmeters, ammeters, &c.—and particularly to safety devices for preventing the injury or destruction of such instruments when used in measuring currents of unknown values.

Devices of this general character have been hitherto proposed of a nature which depended upon the carefulness of the operator in manipulating the instruments and the currents. In multiple-range instruments several binding-posts have been provided, such binding-posts being coupled up to the series resistance of the instrument and protected by a screw-cap, so that ordinarily only the highest-range binding-post became readily accessible for connection with the circuit-wires carrying the current to be measured. In cases of this kind, as in the use of the instrument as a voltmeter, the operator when connecting up to such exposed binding-post would find the range too high to produce the requisite needle deflection. He would then remove the screw-cap from the binding-post of next lower range and connect the circuit-wire to such binding-post. When through with his measurements, it frequently happened that the operator would fail to restore the safety-cap, and upon the next use of the instrument he might carelessly apply the circuit-wire to the wrong binding-post with destructive results to the instrument. Other devices have been proposed; but so far as I am aware none have possessed the requisite quality of automatically restoring the instrument to such a condition that the operator is compelled to first direct the current to be measured through the highest range of the instrument and thence successively through lower ranges until such needle deflection is produced as is practical for the purposes in hand, at the same time when such measurements are completed the instrument is automatically restored to its normal position of open circuit or of highest range, and is thus put in position for the measurement of other currents.

In the accompanying drawings, forming a part of this specification, I have shown my improvements as applied to a voltmeter; but I do not wish to be understood as confining its use to voltmeters, as it is equally applicable to other electrical measuring instruments having a variety of ranges; neither do I wish to be understood that the exact form described in the specification constitutes the sole embodiment of my invention. The underlying principle involved may take different forms and be embodied in various structures, and I have only shown a convenient form in which all of the essential elements of my improvements may be embodied in a single detachable structure convenient for application to instruments already in use, as well as to new instruments; but it may as well form a part of the instrument proper instead of being applied to the instrument case, as shown.

Figure 2:
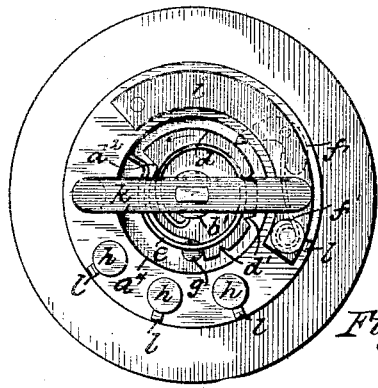
Figure 3:
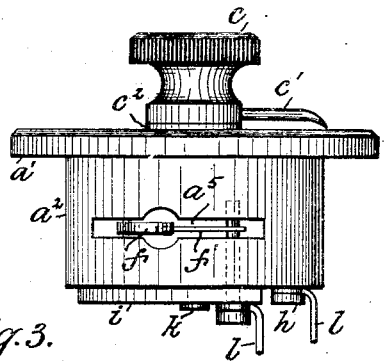
Figure 4:
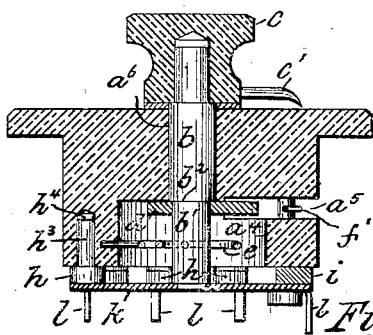
Figure 5:
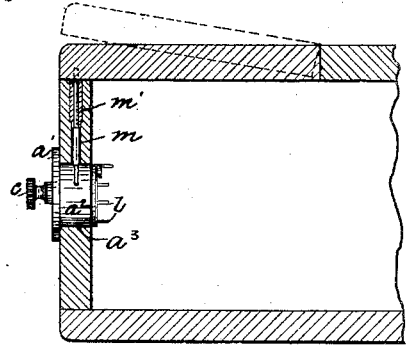
Figure 6:
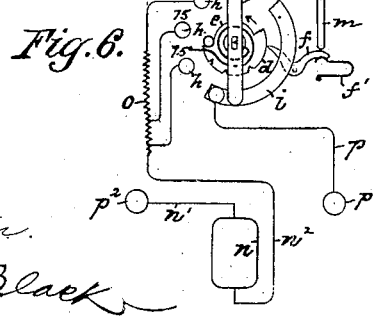

In the accompanying drawings, illustrating the form which I prefer for the above-stated reasons, Figure 1 is a plan view of the switch, showing the dial upon its face. Fig. 2 is a reversed view showing the several contact-points with the interior operating mechanism. Fig. 3 is a side view showing the trip-pawl and spring. Fig. 4 is a sectional view showing the position of the various operating parts and the interior of the switch. Fig. 5 is a vertical sectional view of a portable instrument-case, showing the switch in operative position; and Fig. 6 is a diagrammatical view illustrating the method of wiring the instrument and switch.

Similar letters of reference refer to like parts throughout the specification and drawings.

In the accompanying drawings, $a$ represents the base, which is of general cylindrical form, as shown, and is provided with the flange $a'$, by which the base is secured to the front or forward part of the instrument-case, the cylindrical portion $a^2$ being inserted in an aperture $a^3$ in the front wall of said case. The base $a$ is constructed of insulating material and may be made of hard rubber, fiber, porcelain, glass, or any material suitable for the purpose. It is provided with the cylindrical recess $a^4$ in its under side, said recess being concentric with the body of the base. A lateral slot $a^5$ extends from the bottom of the recess to the exterior, as illustrated, for a purpose hereinafter to be described. The base is also provided with a central aperture $a^6$, which forms a bearing for the central shaft $b$, as clearly shown in Fig. 4.

Secured to the exterior reduced portion of the shaft $b$ is the operating-handle $c$, which carries at its side an index-pointer $c'$ for registry with the index-figures upon the face of the base $a$. A washer $c^2$ is also provided between the inner portion of the handle $c$ and the face of the base $a$, as shown. The inner end of the shaft $b$ is reduced, as at $b'$, so as to form a shoulder $b^2$, which is flush with the bottom of the recess $a^4$. Rigidly secured upon the reduced portion $b'$ and against the shoulder $b^2$ of the shaft $b$ is the disk-ratchet $d$, which is provided with the peripheral notches $d'$ and the cut-away portion $d^2$. Within the recess $a^4$ is the spiral spring $e$, having one end thereof secured to the reduced portion of the shaft $b'$ and its other end secured to the wall of the recess $a^4$, as clearly shown in Figs. 2 and 4. Pivoted in the slot $a^5$, as shown in Fig. 2, is the bell-crank pawl $f$, having its inner end designed for engagement with the peripheral notches $d'$ of the ratchet $d$. It will be noted that the pawl $f$ is entirely inclosed within the slot $a^5$, so that no part of the same ever extends beyond the exterior cylindrical surface $a^2$ of the base $a$.

I have provided in the bottom of the recess a stud $g$, which extends up into the cut-away portion $d^2$ of the disk-ratchet $d$ and serves as a stop to limit the rotation of the shaft $b$ and ratchet $d$. Secured within the slot $a^5$ is the pawl-spring $f''$, the purpose of which is to constantly maintain the point of the pawl against the periphery of the disk $d$ and to press said point into the notches $d'$ of the disk upon the rotation of the same.

Upon the inner end of the base $a$ and circularly arranged thereon are the series of positive multiple-range contact-studs $h$ and the single negative contact-piece $i$, the latter being semicircular, as clearly shown in Fig. 2. As a convenient means for securing these contact-studs $h$ to the base I have provided them with stems $h^3$, which are driven into corresponding apertures $h^4$ in the base.

Upon reference to Fig. 2 it will be noted that the contact-studs $h$ and the contact-piece $i$ are arranged upon opposite sides of the base in such a manner that the contact-spring $k$, rigidly secured to the reduced end $b'$ of the shaft $b$, will span across from the contact-piece $i$ to some one of the contact-studs $h$, the face of both contact-piece $i$ and contact-studs $h$ all lying in the same plane, so that the spring $k$ may slide easily from one contact-stud to the other.

In order to form a convenient means of connection to circuit-wires to be used with the switch, I have provided eye-connectors $l$, the apertured ends of which are secured upon the stems $h^3$ and under the heads of the contact-studs $h$, as illustrated in Fig. 3.

As heretofore stated, the base is fitted into an aperture $a^3$ in the forward side of an instrument-case with the slot $a^5$ uppermost and the tail portion of the pawl $f$, registering with a stud $m$, extending vertically through the upper edge of the box and resting upon the tail portion of the pawl $f$, so that normally with the box open the stud $m$ projects slightly above the upper edge of the box, being maintained in such position by the upward pressure of the spring $f''$ against the tail portion of the pawl $f$. When the box is closed, however, as illustrated in Fig. 5, the edge of the cover will depress the stud $m$ against the tailpiece of the pawl, and thereby lift the point from any one of the notches $d'$ in which it may temporarily rest. As a convenient means for securing the stud $m$ in position I have shown the upper end of the same slightly reduced, so as to form a shoulder, the reduced portion passing through a sleeve $m'$, which is driven into the aperture in the edge of the instrument-case, as shown in Fig. 5.

Under normal conditions and in the position illustrated in Figs. 1 and 2 the contact-spring $k$ is upon open circuit, the rotation of the handle $c$ in the direction of the hands of a watch, as indicated in Fig. 1, and, as indicated by the arrow in Fig. 2, the shaft $b$ will carry the ratchet $d$ around until the pawl $f$ will snap in the first notch, and this against the tension of the spring $e$, in which position the contact-spring $k$ will rest with one end upon the first one of the contact-studs $h$, represented upon the face of the dial by the number "750." Further rotation of the handle will carry the pointer $c'$ to other points upon the dial with the contact-spring $k$ upon the contact-studs $h$ successively and always against the normal bias or tension of the spring $e$. It is understood that these operations must always take place with the cover of the box or case raised. Upon closing the case-cover the stem $m$ will be depressed against the tail of the pawl $f$, thereby raising its point out of some one of the notches $d$, when instantly the spring $e$ will restore the parts with the contact-spring $k$ in the position illustrated in Fig. 2. In other words, it will throw the contact-spring $k$ to open circuit or to the highest range of the instrument, as the case may be. The contacts are connected up in the instrument, as clearly illustrated in Fig. 6, wherein $n$ represents the moving coil of the instrument, $n'$ represents the leading-in wire to the coil, and $n^2$ the wire leading to the series resistance $o$ of the instrument.

I have shown the series resistance $o$ as coupled up in parallel with other contact-studs $h$ and representing a range from 7.5 through seventy-five to seven hundred and fifty volts or amperes.

$p$ represents the return-wire leading to the binding-post $p'$ of the instrument, and $p^2$ represents the other binding-post.

Electrical measuring instruments of the type described are designed for measuring various current ranges, and if such an instrument were introduced into a high-power circuit there would be danger of burning out the winding of the instrument unless some provision were made against such an accident.

In practical operation the instrument provided with my improved safety device is coupled up into a circuit, with the wires thereof connected to the binding-posts $p$ and $p'$, with the contact-spring upon either the highest range or upon open circuit, as shown in Fig. 6. When so connected the cover of the instrument-case is raised to expose the scale and the handle $c$ is turned from the position indicated in Fig. 6 to the highest range of the instrument—viz., seven hundred and fifty—and the measure of the current would be indicated upon the scale. If, however, the current passing through the instrument is too weak to produce the necessary needle deflection a portion of the instrument resistance is cut out by swinging the contact-spring $k$ to the next lower range, and if the current is of sufficient capacity to give a proper needle deflection the reading may be taken from the scale of the instrument; otherwise a still lower range may be taken by moving the spring $k$ to another lower range, and so on until a sufficient needle deflection is obtained and the readings may be taken with accuracy. After taking the readings the cover of the case may be closed and instantly the contact-spring will swing to open circuit, the position indicated in Figs. 2 and 6 under the influence of the spring $e$.

It will thus be seen that my improvement contains all the requisites necessary to protect a measuring instrument against the destructive effects of heavy currents of unknown value and against the carelessness of an operator, inasmuch as when such instrument is coupled up in such a circuit it must be on open circuit or upon highest range, and to render the instrument operative at all the operator is compelled to successively cut out or reduce resistance until a needle deflection is obtained sufficient to render his readings accurate.

I claim—

1. The combination with an electrical measuring instrument having a case and cover therefor, of means for compelling the direction of an electrical current through a high resistance and means rendered operative by opening said cover for thereafter cutting out portions of said resistance to produce a successively wider needle deflection of the instrument.

2. In an electrical measuring instrument having a case and hinged cover, the combination of means for first compelling the direction of the current through a high resistance and means rendered operative by opening said cover for thereafter changing said resistance by predetermined graduations to produce successively wider needle deflections of the instrument.

3. In an electrical measuring instrument having a hinged cover, the combination of a resistance with means for first compelling the direction of a current through all of said resistance and means normally inoperative, but rendered operative by opening said cover for thereafter cutting out portions of said resistance to produce successively wider needle deflections of the instrument.

4. The combination with an electrical measuring instrument its case and hinged cover, of means for compelling the direction of an electrical current through a high resistance and means for thereafter cutting out portions of said resistance to produce a successively wider needle deflection of the instrument and means for restoring said parts to initial position upon the completion of any particular measurement by the closing of said hinged cover.

5. In an electrical measuring instrument having a hinged cover, the combination of means for first compelling the direction of the current through a high resistance and means for thereafter changing said resistance by predetermined gradations to produce successively wider needle deflections of the instrument and means actuated by the closing of said hinged cover for restoring said parts to initial position upon the completion of any particular measurement.

6. In an electrical measuring instrument having a case and cover, the combination of a resistance with means for first compelling the direction of a current through all of said resistance and means for thereafter cutting out portions of said resistance to produce successively wider needle deflections of the instrument and means actuated by the closing of said cover for restoring said parts to initial position upon the completion of any particular measurement.

7. In a safety device for electrical measuring instruments having a case and a cover therefor, a series of positive multiple-range contacts and a single negative contact, a contact-spring and means for setting said spring to electrically connect said negative contact successively with said positive contacts and means actuated by closing said cover to trip said contact-spring to restore it to normal position.

8. In a safety device for electrical measuring instruments, a case having a cover a series of positive multiple-range contacts, a single negative contact, a contact-spring, means for setting said spring to electrically connect said negative contact successively with said positive contacts, a tension-spring for maintaining in said contact-spring a normal bias to initial position and trip mechanism actuated by said cover for releasing said contact-spring from set position.

9. In an electrical measuring instrument, the combination with the instrument-case and its hinged cover, of a safety device secured to said case, said device comprising a series of positive multiple-range contacts and a single negative contact, a contact-spring, means for setting said spring to electrically connect said negative contact successively with said positive contacts, a tension-spring for maintaining in said contact-spring a normal bias to initial position and trip mechanism operated by said hinged cover to release said contact-spring from set position.

10. In an electrical measuring instrument, the combination with the instrument-case and its hinged cover, of a base secured to said case, a series of positive contacts and a negative contact secured to said base, a central shaft, a contact-spring mounted on said shaft, a tension-spring connecting said shaft and said base for maintaining in said shaft, a normal bias to initial position, a contact-spring secured to said shaft and means for setting said shaft with said contact-spring to electrically connect said negative contact successively with said positive contacts against the normal bias of said tension-spring and trip mechanism operated by said hinged cover to release said shaft and contact-spring from set position.

11. In a safety device for electrical measuring instruments, the combination of a case having a cover, a plurality of positive contacts connected in parallel with a series resistance, a single negative contact connected to the return-circuit of the instrument, a contact-spring and means for setting the same to successively connect said positive contacts with the negative contact, means actuated by said cover for tripping said setting means to release said contact-spring and a tension-spring for restoring said contact-spring to initial position.

12. In a safety device for electrical measuring instruments, a case and a cover therefor, a base, a plurality of positive contacts and a single negative contact mounted upon said base, said positive contacts being connected in parallel with the series resistance of the instrument, a central shaft, a contact-spring mounted upon said shaft, a tension-spring secured to said shaft and to the base, means for setting said contact-spring to successively connect said positive contacts with said negative contact and means actuated by said cover for tripping said setting means to permit said tension-spring to restore said contact-spring to initial position.

13. A safety device in combination with an electrical measuring-instrument case and means for rendering said device inoperative by the closing of said case.

14. A safety device in combination with a portable electrical measuring-instrument case and means for rendering said device operative or inoperative by the opening or closing of said case.

15. A safety device for electrical instruments, in combination with the instrument-case and means for rendering said device operative by the opening of said case.

This specification signed and witnessed this 11th day of December, 1906.

ADELBERT O. BENECKE.

Witnesses:
 LOUIS M. SANDERS,
 C. A. ALLISTON.